March 8, 1932. L. F. BIGGINS 1,848,409
AIR CIRCULATING APPARATUS FOR INCUBATORS OR THE LIKE
Filed Oct. 23, 1929
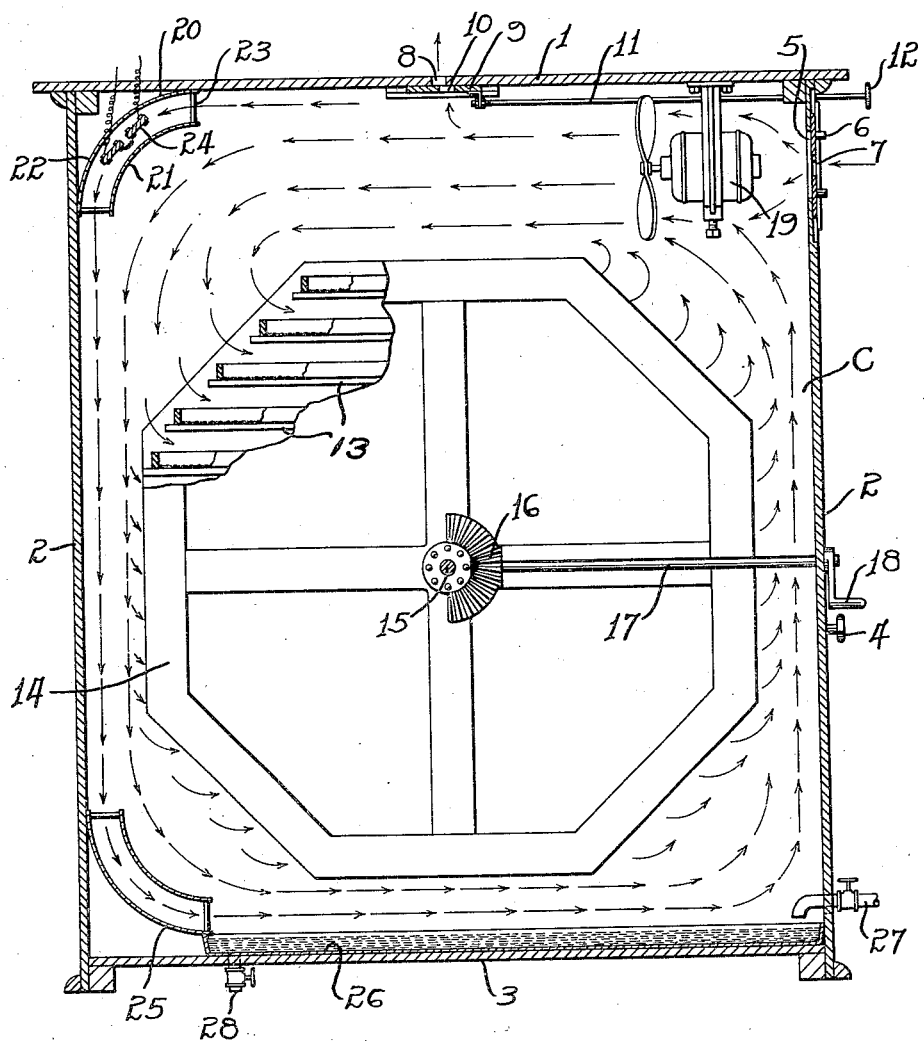
Inventor
Leo F. Biggins
By Owen & Owen
Attorneys Patented Mar. 8, 1932

1,848,409

UNITED STATES PATENT OFFICE

LEO F. BIGGINS, OF ADRIAN, MICHIGAN

AIR CIRCULATING APPARATUS FOR INCUBATORS OR THE LIKE

Application filed October 23, 1929. Serial No. 401,877.

This invention relates to incubators, hatchers, or the like, but more particularly to air circulating and conditioning systems for such devices.

An object of this invention is to provide a new and improved air circulating system which will uniformly distribute the air within a chamber, eliminate drafts, and maintain the proper humidity of the air.

Another object is to provide a simple and efficient chamber useful for incubation of eggs, or hatching and brooding of chicks, in which the air is uniformly maintained at the proper temperature, and in which the proper degree of humidity is secured.

Other objects and advantages will hereinafter appear.

The invention is shown by way of illustration, but not of limitation, on the accompanying drawing, in which the figure is a vertical sectional elevation of an incubator.

The illustrated embodiment of the invention comprises an incubator consisting of a closed chamber C having a top wall 1, side walls 2, and bottom wall 3. One of the side walls is provided with a door to permit access to the interior, only the knob 4 thereof being shown. Air is admitted to the inside of the chamber C through an inlet port 5 controlled by a shutter 6, which is formed with a relatively small opening 6 and an outlet vent 8 in the top wall, which is controlled by a slide shutter 9 having opening 10. The slide 9 is controlled by a rod 11, which extends outside of the chamber, and is provided with a handle 12. Arranged within the chamber is a stack of trays 13, in this instance carried by a drum 14 mounted on a shaft 15. The drum is turned by gear means 16 controlled by a shaft 17 having a handle 18 on the outside of the structure.

Connected to the top wall 1 of the housing in advance of the air inlet 5 is an electric fan 19. The fan 19 creates a horizontal current of air in the space between the top wall 1 and the stack of trays 13, and a portion of this air passes to a deflector 20, which is made up of curved plates 21 and 22 held in spaced relation by rods 23. The reflector 20 is positioned in the corner of the structure, and, as shown, may be secured to the top wall 1 and adjacent side wall 2. Preferably, the deflector 20 extends the length of the chamber. It is obvious that the air passing through the deflector 20 is directed vertically downwardly along the adjacent side wall 2 of the chamber, thereby providing a column of air along this wall. Positioned within the deflector 20 is an electric heating unit 24 which heats the air passing therethrough so that the column of air along the side wall of the chamber is heated to prevent the cold air normally adjacent the side wall of the chamber from passing to the stack of trays 13.

A similar deflector 25 is disposed at the lower part of the chamber C in position to receive the heated column of air from the deflector 20. The deflector 25 is so constructed and arranged to direct the air passing therethrough over a pan 26 which rests on the bottom 3, which contains water in order to moisten the air passing thereover. Water is introduced into the pan through a pipe 27 so that a constant circulation of water through the pan may be secured if desired.

From the pan 26 the air passes upwardly to the fan 19. It will be understood that the small amount of fresh air is constantly being drawn in through the inlet vent, and a small portion is constantly being discharged under normal conditions through the outlet vent 8. The heater 24 may be thermostatically controlled in any suitable manner so that the temperature of the air within the chamber C is maintained at the desired degree. It will further be observed that the arrows on the drawing indicate the passage of air throughout the chamber, a portion of the air being passed through the stack of trays 13 in order to continuously supply fresh, warm air to the eggs contained therein.

An important feature of the invention resides in the provision of a heated column of air along the side walls of the chamber so as to eliminate the liability of drafts, and more efficiently to maintain the temperature of the air within the chamber at the desired degree. It will be understood that the heated column of air, after passing through the deflector 25 and over the moisture pan 26, passes vertically upwardly along the opposite side wall of the chamber so that a column of air is created along opposite side walls of the chamber.

While the above described arrangement is the best form known to me at the present time, it is to be understood that numerous changes in details of construction, arrangement and operation may be effected without departing from the spirit of the invention, especially as defined in the appended claims.

What I claim as new and desire to secure by Letters Patent is:

1. In a device of the class described, a closed chamber having top, bottom and side walls, a fan adjacent an end of one wall for directing a current of air along such wall, a curved deflector at the end portion of such wall for creating a column of air along the adjacent wall at substantially right angles to the direction of said first current, a heating device for heating the air passing through said deflector, a moisture pan, a second deflector at the opposite end portion of said adjacent wall for directing said air column to said moisture pan, and air inlet and outlet vents for said chamber.

2. In a device of the class described, a closed chamber having top, bottom and side walls, a fan adjacent the top wall for directing a current of air horizontally toward the opposite wall, an air inlet in rear of said fan, a deflector in the region of said opposite wall constructed and arranged to create a vertical column of air along the respective side wall, an adjustable air outlet in the top wall of said chamber between said fan and deflector, said deflector also comprising a heating device, a second deflector at the lower end portion of such side wall, and a moisture pan on the floor of said chamber, said second deflector being constructed and arranged to direct said vertical column of air into said moisture pan.

In testimony whereof I have hereunto signed my name to this specification.

LEO F. BIGGINS.